United States Patent [19]

Beck et al.

[11] Patent Number: 5,103,322
[45] Date of Patent: Apr. 7, 1992

[54] SCANNER WITH RETRACTABLE ROLLER FEED

[75] Inventors: Jeffrey E. Beck, Somerville; Lawrence E. Green, Burlington; William K. Smyth, Sudbury, all of Mass.

[73] Assignee: Polaroid Corporation, Cambridge, Mass.

[21] Appl. No.: 522,905

[22] Filed: May 14, 1990

[51] Int. Cl.⁵ .............................................. H04N 1/04
[52] U.S. Cl. .................................... 358/496; 358/493; 358/498; 358/492; 271/272; 271/273; 271/274; 355/47; 355/48
[58] Field of Search ............... 358/493, 496, 498, 492; 271/245, 233, 269, 271, 273, 272, 274; 355/308, 309, 48, 47

[56] References Cited

U.S. PATENT DOCUMENTS

| | | | |
|---|---|---|---|
| 4,122,457 | 10/1978 | Erikson et al. | 271/274 |
| 4,382,267 | 5/1983 | Angle | 358/213 |
| 4,523,234 | 6/1985 | Sangu | 358/293 |
| 4,530,590 | 7/1985 | Kawai | 355/309 |
| 4,558,357 | 12/1985 | Nakagawa et al. | 358/75 |
| 4,590,514 | 5/1986 | Ikeda et al. | 358/75 |
| 4,663,656 | 5/1987 | Elabd et al. | 358/75 |
| 4,665,408 | 5/1987 | Toriumi et al. | 271/269 |
| 4,667,253 | 5/1987 | Chen | 358/293 |
| 4,672,453 | 6/1987 | Sakamoto | 358/294 |
| 4,692,794 | 9/1987 | Suzuki | 358/44 |
| 4,707,615 | 11/1987 | Hosaka | 250/578 |
| 4,731,657 | 3/1988 | Miyagi | 358/285 |
| 4,761,683 | 8/1988 | Matteson et al. | 358/75 |
| 4,767,937 | 8/1988 | Norsworthy | 250/578 |
| 4,769,718 | 9/1988 | Imamura | 358/285 |
| 4,775,798 | 10/1988 | Munier | 250/578 |
| 4,802,229 | 1/1989 | Yamada | 382/1 |
| 4,805,012 | 2/1989 | Agostinelli et al. | 358/75 |
| 4,963,896 | 10/1990 | Murasaki et al. | 271/271 |

Primary Examiner—Edward L. Coles, Sr.
Assistant Examiner—Edward Lefkovitz
Attorney, Agent, or Firm—Edward S. Roman

[57] ABSTRACT

A scanner is operative with an imaging system for inducing a mechanical movement of a subject during an optical scanning of the subject to provide an image of the subject. The subject which is in the shape of a card is advanced along a travel path past an optical viewing site by means of a drum, the scanner including a first roller and a second roller which urge the subject against the drum. Initially, the first roller is located between the viewing site and the entry port for receipt of the subject in a first nip between the first roller and the drum. The second roller is positioned fixed on the opposite side of the viewing site. The first roller is supported by an arm which swings about a rotational axis of the drum to vary the spacing between the two rollers. Upon rotation of the drum in a forward direction for induction of the subject, a brake located between the drum and the arm drags the arm and the first roller towards the second roller to facilitate a transference of a leading edge of the subject from the first nip to a second nip defined by the second roller and the drum. Preparatory to optical scanning of the subject which is accomplished during reverse rotation of the drum, the arm swings the first roller away from the second roller to present the viewing site to the optical scanning beam.

8 Claims, 4 Drawing Sheets

SCANNER WITH RETRACTABLE ROLLER FEED

BACKGROUND OF THE INVENTION

This invention relates to a scanner operative in an imaging system for moving a subject past an optical beam to accomplish an optical scanning of the subject and, more particularly, to the use of a drum and a pair of rollers for guiding the subject along a path of travel past a viewing site at the light beam, and wherein a spacing between the rollers can be varied in synchronism with rotation of the drum to facilitate transfer of a leading edge of the subject between rollers prior to presentation of the subject to the light beam for the optical scanning.

Scanners providing for optical scanning of a subject are constructed frequently with mechanical components which move a subject along a path of travel past a viewing site where the subject is scanned by an optical beam. One form of apparatus for accomplishing the movement of the subject includes a drum having a cylindrical surface disposed at the viewing site, and includes two rollers disposed in contact with the drum and located at opposite sides of the viewing site. Rotation of the drum brings successive portions of the subject into the viewing site while pressure between the rollers and the drum secures the subject to the drum to enable accurate positioning of the successive portions of the subject during the scanning procedure.

It may be desirable to construct the scanning apparatus in a manner which admits the subject into the scanner by rotation of the drum in a forward direction for the purpose of ascertaining the physical size of the subject, this being followed by retraction of the subject by rotation of the drum in the reverse direction. The scanning of the subject by the optical beam takes place during the retraction of the subject. Such a scanning procedure is useful because an image processor operative in conjunction with the movement of the subject can be provided with information as to the physical size of the subject prior to the actual optical scanning.

A problem arises in the use of such a scanner in that the spacing between the rollers requires that the subject have a physical form which facilitates advancement of the subject from a first nip between a first of the rollers and the drum to a second nip between the second of the rollers and the drum. Typically, the subject is in the form of a photograph or a picture postcard, such card-shaped subject having a leading edge, a trailing edge, and opposed side edges. The card may be inserted manually into the first nip such that, upon rotation of the drum, the card is drawn past the viewing site to be engaged in the second nip. However, should the leading edge portion of the card be bent or otherwise disfigured by handling by persons viewing the card, or by other causes, there is a chance that the leading edge, during advancement of the subject, may deflect away from the second nip and pass over the second roller rather than through the nip. This would disrupt the scanning procedure.

SUMMARY OF THE INVENTION

The foregoing problem is overcome and other advantages are provided by a scanner incorporating a drum for movement of a subject having the general shape of a card past a viewing site for optical scanning of the subject. Also included within the scanner are a first roller and a second roller providing respectively a first and a second nip with the drum, and being disposed respectively before and after the viewing site with respect to movement of the subject along a path of travel through the viewing site. The scanner is operative to advance the subject initially past the viewing site to ascertain the physical size of the subject prior to the optical scanning, the optical scanning being accomplished during a retraction of the subject along the travel path.

It is an object of the invention to have the two rollers spaced apart at a sufficiently large distance to insure clearance of the optical beam during the generation of a scan line, while providing a sufficiently small distance between the rollers during a passage of a leading edge of the subject from the first nip to the second nip prior to the scanning. In accordance with the invention, this is accomplished by physically moving at least one of the rollers so as to vary the spacing. The variation in spacing provides for a relatively large distance during the optical scanning, and a relatively small distance during the initial advancement of the subject from the first nip to the second nip.

In accordance with a preferred embodiment of the invention, an axis of rotation of the second roller is maintained fixed relative to the travel path of the subject, while the axis of rotation of the first roller is moved so as to provide the variation in spacing. The first roller is carried by an arm which is made to swing back and forth between two fixed stops. The two stops define limits in the swinging movement of the arm, and set corresponding limits on the spacing between the two rollers. Movement of the swing arm is synchronized with movement of the drum by pivoting the swing arm about the drum axis and by connecting the swing arm to the drum by means of a slip clutch or brake. The brake produces a frictional force between the arm and the drum during a rotation of the drum which swings the arm from one of the stops to the other of the stops during an initial stage of rotation of the drum in the forward direction and during an initial stage of rotation of the drum in the reverse direction. Also included within the scanner are two optical sensors for sensing the location of the subject, a first of the sensors being located ahead of the first roller along the travel path, and a second of the sensors being located beyond the second roller on the travel path.

During operation of the scanner, a person places the leading edge of the subject in an entry port of a housing enclosing the scanner, and advances the subject along the path of travel past the first sensor to the first nip. The person then pushes a button to start operation of the scanner. Thereupon, the drum rotates in the forward direction to advance the leading edge of the subject towards the second nip. During the initial stage of rotation of the drum, the arm moves with the drum and swings the first roller towards the second roller to decrease the spacing between the rollers, thereby to ensure a smooth and safe transference of the leading edge of the subject from the first nip to the second nip. The drum continues to rotate while an inner one of the stops holds the arm against further rotation. The subject advances past the second sensor, and continues to advance until the trailing edge is at the first sensor. The length of the subject is now known. The subject is advanced a predetermined distance further to bring the trailing edge within the first nip.

The operation continues with reversal of the rotation of the drum for retraction of the subject. During the initial reverse rotation of the drum, the arm swings the first roller away from the second roller to expose the viewing site to the optical beam. Scanning with the optical beam is initiated. The arm contacts an outer one of the two stops which holds the roller spacing at the maximum position. Further reverse rotation of the drum passes the subject along the travel path between the two roller nips to expose successive portions of the subject to the optical scanning. At the conclusion of the optical scanning, the leading edge of the subject has returned to the first nip to allow either manual removal of the subject from the scanner or a rescan, if desired.

BRIEF DESCRIPTION OF THE DRAWING

The aforementioned aspects and other features of the invention are explained in the following description, taken in connection with the accompanying drawing wherein:

FIGS. 5A-H show various stages in the advancement and retraction of subject matter being scanned by the scanner of FIG. 1 for explaining operation of the scanner and of a computer which controls the scanner, the views of FIGS. 5A-H being an enlarged fragmentary view of the scanner shown diagrammatically, the subject matter being in the form of a card, the FIGS. 5A-H indicating sequential steps in the operation, wherein:

FIG. 5A shows a leading edge of the card contacting the nip of an outer roller with a drum, the outer roller being carried by a swing arm about an axis of the drum;

FIG. 5B shows the swing arm contacting an inner stop;

FIG. 5C shows the leading edge of the card reaching an inner sensor;

FIG. 5D shows the trailing edge of the card clearing an outer sensor;

FIG. 5E shows further advance of the card by a predetermined distance to bring the trailing edge of the card to the nip of the outer roller and the drum;

FIG. 5F shows retraction of the card during scanning to bring the swing arm to the outer stop;

FIG. 5G shows further retraction of the card wherein the leading edge of the card clears the inner sensor; and FIG. 5H shows still further retraction of the card by a predetermined distance to bring the leading edge of the card to the nip between the outer roller and the drum.

DETAILED DESCRIPTION

Figure 1:
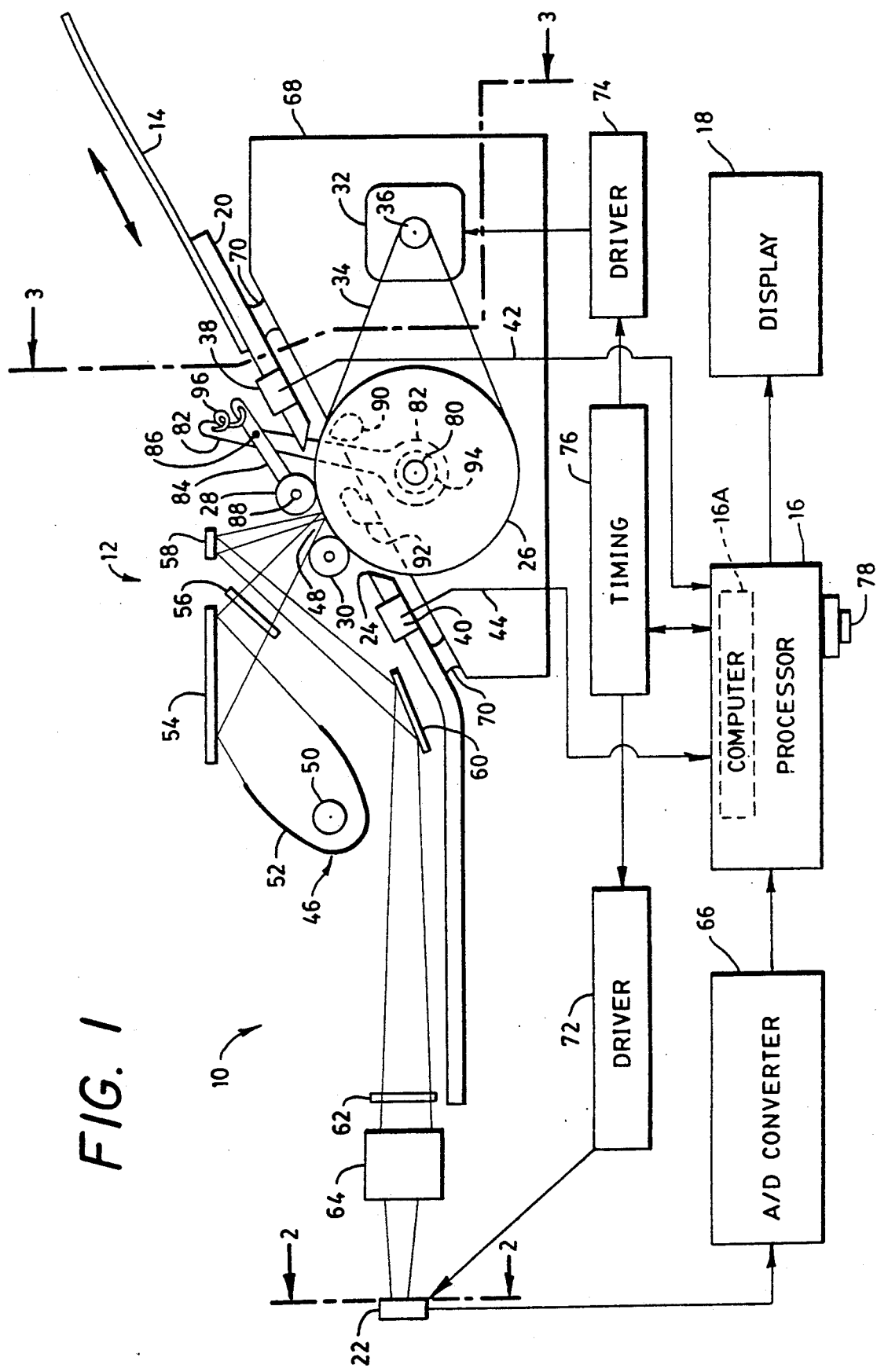
FIG. 1 is a side elevation view, indicated diagrammatically, of a scanner incorporating the invention and forming a part of an imaging system, FIG. 1 showing also a block diagram of further components of the imaging system.
Figure 2:
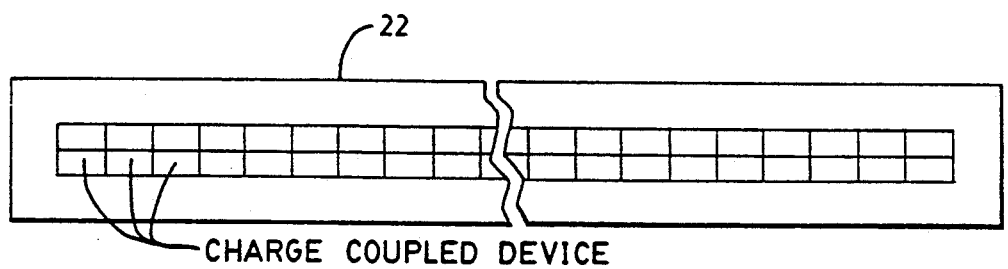
FIG. 2 is a plan view, taken along the line 2—2 in FIG. 1, of a detector assembly comprising a linear array of charge-coupled devices (CCDs)
Figure 3:
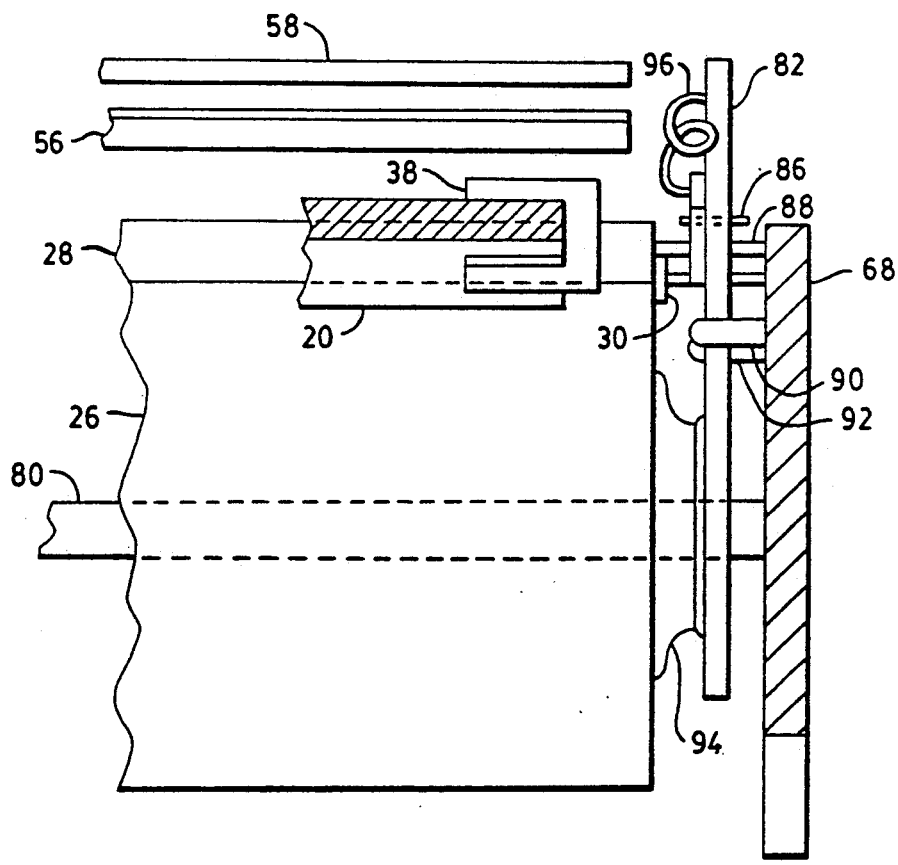
FIG. 3 is an end view, taken along the line 3—3 in FIG. 1, of the scanner showing connection of a pivoting arm to a rotating drum by a brake.

FIGS. 1-3 show an imaging system 10 which comprises a scanner 12 for scanning a subject such as a photographic film element or card 14 having a picture, text or other form of data thereon, and an electronic signal processor 16 which includes a computer 16A for converting information obtained by the scanner 12 into an image presented on a display 18. The computer 16A also directs the scanner 12 to provide movement of the card 14 to accomplish a scanning of the card 14 as will be described hereinafter. The scanner 12 includes a bed 20 upon which the card 14 is advanced for viewing by a CCD detector assembly 22. The bed 20 is provided with an aperture 24. The scanner 12 further comprises a drum 26, an outer roller 28 and an inner roller 30 which are located at the aperture 24. The rollers 28 and 30 press against the drum 26 in the absence of the card 14, and squeeze the card 14 against the drum 26 during the presence of the card 14 at the interface between the drum 26 and the rollers 28 and 30.

The drum 26 is driven by a stepping motor 32 connected to the drum 26 by a belt 34. The belt 34 is driven by an output pinion 36 of the motor 32. The drum 26 has a rubbery type of surface which provides a secure friction grip with the card 14 so as to advance the card 14 in a line-by-line fashion in response to successive rotational increments of the motor 32. An outer optical position sensor 38 and an inner optical position sensor 40 are provided for signaling locations of leading and trailing edges of the card 14 during passage of the card 14 along the bed 20. Each of the sensors 38 and 40 may be constructed in a well-known fashion employing an LED (light-emitting diode) transmitter, and a photodetector diode receiver for generating an electric signal designating the presence or absence of an LED beam of light due to the absence of or presence, respectively, of the card 14. The sensors 38 and 40 are connected by electric signal lines 42 and 44, respectively, to the processor 16.

The scanner 12 includes a lamp 46 to provide light for illuminating the card 14 when the card 14 is in a viewing site 48 of the bed 20. The lamp 46 is composed of a light source, or bulb, 50 enclosed by a reflector 52 for directing rays of light in substantially collimated fashion along an optical path wherein light can reflect from the card 14 to the detector assembly 22. In the optical path, rays of light from the lamp 46 are reflected off of a first planar mirror 54, and are directed through a first polarizer 56 onto the site 48 where the card 14 is to be viewed. The viewing site 48 is located between the two rollers 28 and 30 on the cylindrical surface of the drum 26, or on the front surface of the card 14 when the card 14 lies upon the surface of the drum 26. Rays of light reflected from the viewing site 48 proceed along the optical path to a second planar mirror 58 from which the rays are reflected further via a third planar mirror 60. The rays of light reflected from the third mirror 60 propagate through a second polarizer 62 and a converging lens 64 to image upon the detector assembly 22.

The two polarizers 56 and 62 are useful in enhancing the quality of the imaging signal outputted by the detector assembly 22 by excluding unwanted stray light from surface scratches which may be present on the object being scanned by the imaging system 10. The concavity of the reflector 52 of the lamp 46 provides for a uniform high brightness illumination of the successive scan lines of the card 14, and the lens 64 brings the scan lines successively to a sharp focus upon a linear array of CCD cells (FIG. 2) in the CCD detector assembly 22. The linear array of the cells is oriented perpendicularly to the plane of the drawing in FIG. 1. Output signals of the detector assembly 22, produced upon detection of the pixels of the successive scan lines of the card 14, are applied via an analog-to-digital converter 66 to the signal processor 16 for development of the image of the subject matter on the card 14. The converter 66 converts analog signals outputted by the assembly 22 to digitally formatted signals for use by the processor 16.

The scanner 12 includes frame 68 which supports drum 26, the motor 32, and the bed 20 in their respective positions. The bed 20 is secured to the frame 68 by legs 70. The system 10 includes a driver 72 which provides well-known drive signals including gating signals for operation of the detector assembly 22, and a driver 74 which provides well-known drive signals for operation of the stepping motor 32. In the operation of the system 10, the processor 16 activates a timing unit 76 to provide timing signals for activating the drivers 72 and 74 for operation of the detector assembly 22 and the stepping motor 32. A push button 78 is connected electrically to the processor 16 to allow a person to initiate operation of the system 10 by pushing the button 78. Preferably, the system 10 will be operated in conjunction with a host computer in which case initiation of operation of the system will be controlled by the computer in a well-known manner.

In the operation of the scanner 12, the card 14 is guided through the viewing site 48 by means of the outer roller 28, the inner roller 30 and the drum 26. Friction provided between the card 14 and the drum surface, described above, propels the card 14 in a forward direction along the bed 20 towards the detector assembly 22, or in a reverse direction away from the detector assembly 22 in response, respectively, to forward and reverse directions of rotation of the drum 26.

In accordance with the invention, the spacing between the outer roller 28 and the inner roller 30 is variable to ensure that a grip on an edge of the card 14 is retained as the card 14 passes between the rollers 28 and 30. Thus, the rollers 28 and 30 can be spaced apart a full distance to expose the viewing site 48 for scanning of an image on the card 14, and can be brought closely together to a minimum distance to permit safe transfer of the leading edge of the card 14 from the outer roller 28 to the inner roller 30. The variation in spacing between the rollers 28 and 30 is accomplished by maintaining the inner roller 30 fixed in its position relative to the frame 68 while the outer roller 28 is movable about the periphery of the drum 26. The positioning of the outer roller 28 is accomplished as follows.

The scanner 12 further comprises a shaft 80 about which the drum 26 rotates, and an arm 82 which pivots about the shaft 80. The shaft 80 is mounted to the frame 68. A strut 84 is pivotally connected by a pivot 86 to the arm 82, and carries the outer roller 28. The outer roller 28 is secured rotatably by a shaft 88 to an end of the strut 84. An outer stop 90 and an inner stop 92 are provided on the frame 68 for limiting a pivoting movement of the arm 82, such that the arm 82 can swing about the shaft 80 between the stops 90 and 92 to transport the outer roller 28 in both forward and reverse directions. A slip clutch or brake 94 is interposed between the arm 82 and the drum 26 to provide a constant amount of friction between the arm 82 and the drum 26. The friction provides a force which drives the arm in a pivoting motion about the shaft 80 in synchronism with rotation of the drum 26. Thus, upon inception of forward rotation of the drum 26, the arm 82 pivots in the forward direction, toward the detector assembly 22, until stopped by the inner stop 92, at which point the arm 82 remains stationary as the drum 26 continues to rotate. Upon inception of reverse rotation of the drum 26, the arm 82 pivots in the reverse direction, away from the detector assembly 22, until stopped by the outer stop 90, at which point the arm 82 remains stationary as the drum 26 continues to rotate. A spring 96 is connected between outer ends of the arm 82 and the strut 84 to urge the two ends together and, by virtue of the pivoting of the strut 84 about the arm 82, to urge the outer roller 28 against the cylindrical surface of the drum 26 during both forward and reverse rotation of the drum 26.

Figure 4:
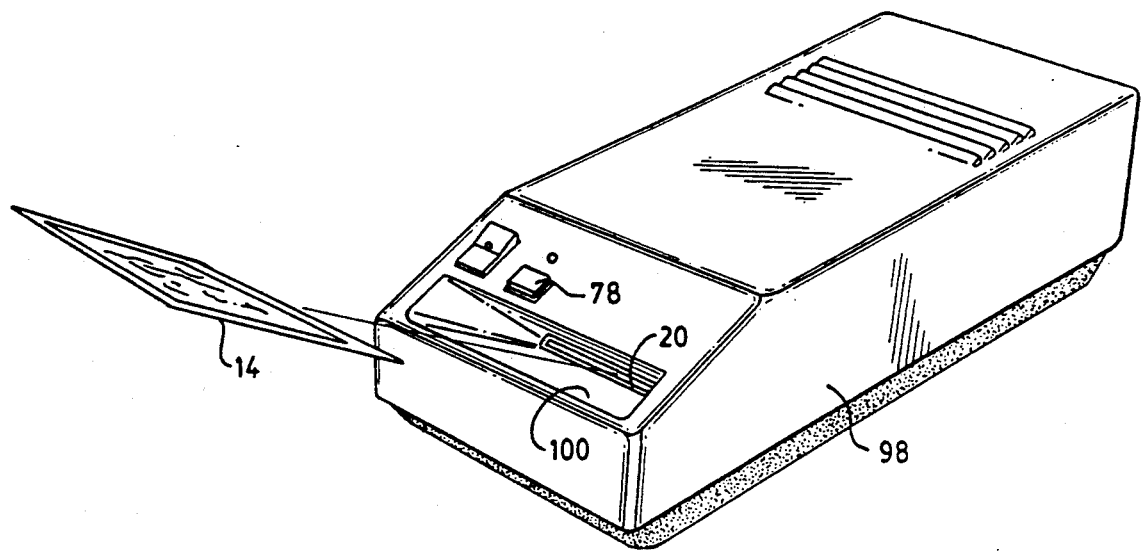
FIG. 4 shows a housing for enclosing the scanner of FIG. 1.

FIG. 4 shows a housing 98 suitable for enclosing the scanner 12 and the signal processor 16 of FIG. 1. The front panel of the housing 98 includes the button 78 for activating the processor 16, and an entry port 100 by which a card 14 is inserted into the housing 98 to be placed upon the bed 20.

Figure 5A:
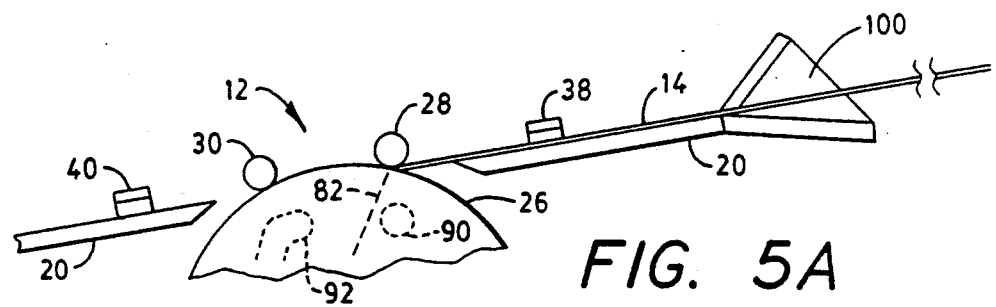

FIGS. 5A–H show a succession of steps in the movement of the card 14 for induction of the card 14 into the scanner 12 followed by retraction of the card 14 to accomplish an optical scanning of the card 14. The computer 16A of the signal processor 16 directs the rotation of the drum 26 in both forward and reverse directions of rotation. Therefore, the sequence of steps depicted in FIGS. 5A–5H also serve to describe operations of the computer 16A. In FIG. 5A, a person using the scanner 12 has just inserted the card 14 into the entry port 100, and has slid the card 14 along the surface of the bed 20 until the leading edge of the card 14 has contacted the first nip defined by the outer roller 28 and the drum 26. At this point in the operating procedure, the drum 26 is stationary, and the microprocessor 16 has not yet been enabled by use of the button 78 (FIGS. 1 and 4). The swing arm 82 presses against the outer stop 90, this position of the arm 82 establishing the location of the first nip during insertion of the card 14 into the scanner 12.

Figure 5B:
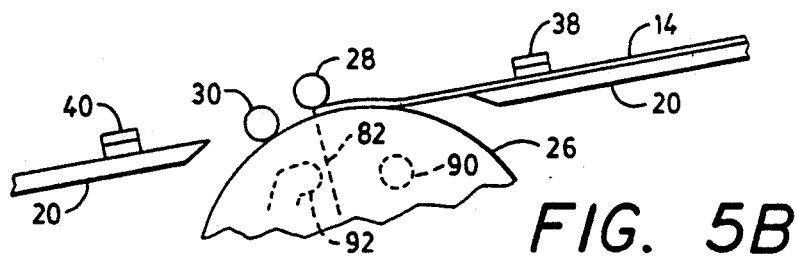

The person operating the scanner 12 then presses the button 78 to activate the processor 16. The computer 16A then directs rotation of the drum 26 in the forward direction with the result that the leading edge of the film 14 is pulled in the forward direction. The forward rotation of the drum 26 also applies a torque via the brake 94 to the arm 82 to swing the arm 82 and the outer roller 28 in the forward direction. The first nip accompanies the leading edge of the card 14 as the card 14 advances along the bed 20. In FIG. 5B, the arm 82 has just contacted the inner stop 92. Also, it is noted that the outer sensor 38 observes the presence of the card 14 and outputs a signal along line 42 (FIG. 1) to the computer 16A to indicate that a portion of the card 14 is present at the outer sensor 38.

Figure 5C:
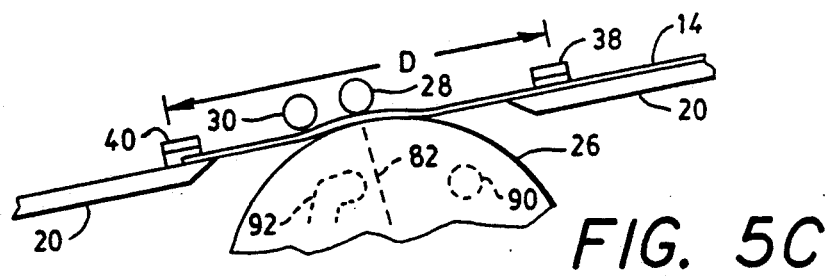

In FIG. 5C, the drum 26 has continued to rotate in the forward direction to bring the leading edge of the card 14 to the inner sensor 40 which now outputs a signal along line 44 to the computer 16A indicating the presence of a portion of the card 14 at the inner sensor 40. The outer sensor 38 is still outputting a signal to the computer 16A indicating the presence of a portion of a card 14 at the outer sensor 38. The computer 16A has previously stored the value, D, of the distance between the two sensors 38 and 40. In view of the fact that both of the sensors 38 and 40 are indicating presence of the card 14, the computer 16A knows that the card 14 has a length, as measured along a path of travel of the card 14 on the bed 20, which is equal to or greater than the distance D. Also, it is noted that the swing arm 82 is retained in its position of abutment against the inner stop 92 as the drum 26 continues to rotate in the forward direction. Thus, in both FIGS. 5B and 5C, a minimum spacing is maintained between the outer roller 28 and the inner roller 30.

Figure 5D:
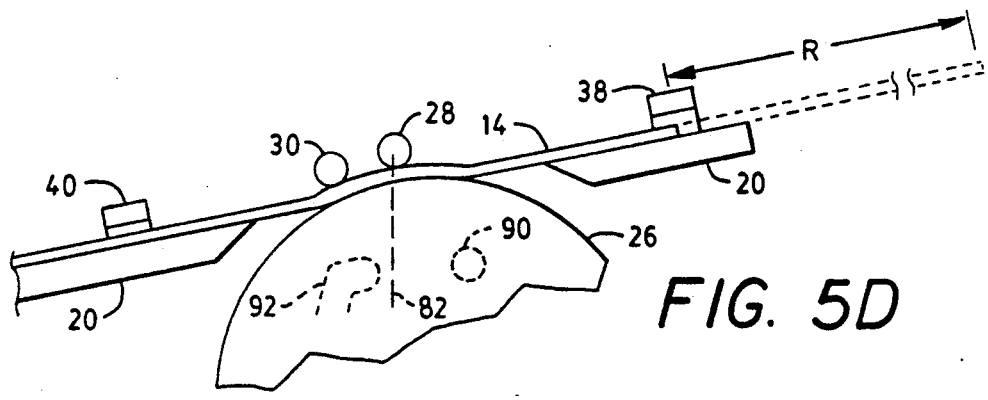

As the drum 26 rotates in the forward direction, the computer 16A counts the number of steps of the stepping motor 32 so as to store the amount of rotation, in radians, undergone by the drum 26 since the moment when the leading edge of the card 14 passed the inner sensor 40. FIG. 5D shows further advancement of the card 14 which brings the trailing edge of the card 14 to the outer sensor 38. The additional travel undergone by the card 14 from the situation depicted in FIG. 5C to the situation depicted in FIG. 5D is due to rotation of the drum 26, the increment in distance, R, due to rotation of the drum 26 being equal to the product of the angle of rotation in radians of the drum 26 multiplied by the radius of the drum 26. The value of the radius of the drum has been previously stored in the computer 16A and, accordingly, the computer 16A readily calculates the additional travel distance R which brings the trailing edge of the card 14 to the outer sensor 38. The total length, L, of the card 14 is equal to the sum of D plus R. Therefore, in the situation depicted in FIG. 5D, the computer 16A knows both the position and the length of the card 14.

Figure 5E:
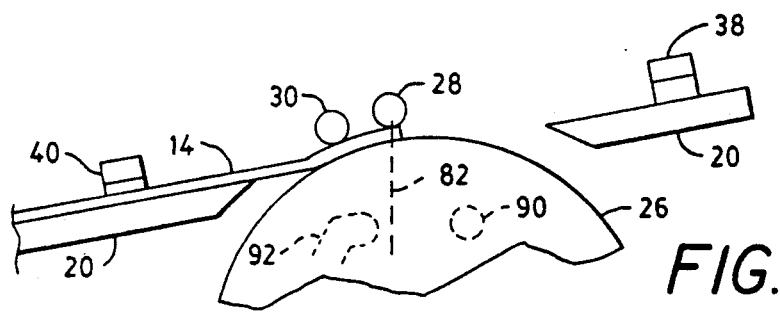

Prior to initiation of the optical scanning of the card 14, the trailing edge of the card 14 is brought to the first nip defined by the outer roller 28 and the drum 26. This situation is depicted in FIG. 5E. At this point in the operation, the swing arm 82 is still resting against the inner stop 92. The location of the first nip (as shown in FIG. 5E) relative to the outer sensor 38 is stored previously in the computer 16A so that the computer 16A can order readily the additional forward rotation of the drum 26 to advance the trailing edge of the card 14 from the outer sensor 38 to the location of the first nip depicted in FIG. 5E.

Figure 5F:
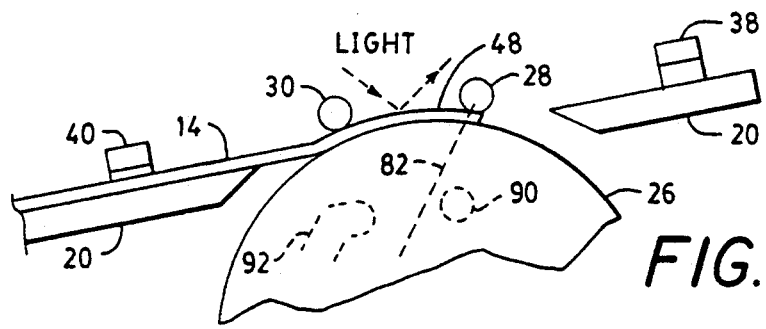

The computer 16A now directs a reversal in the direction of rotation of the drum 26. During rotation of the drum 26 in the reverse direction, the swing arm 82 is dragged by the brake 94 back to abut against the outer stop 90 as depicted in FIG. 5F. Concurrently with the movement of the arm 82 back to the outer stop 90, the outer roller 28 and the trailing edge of the card 14 also retract back towards the outer sensor 38 to the position depicted in FIG. 5F. The rollers 28 and 30 are now at their maximum spacing, the two rollers 28 and 30 being located at opposite sides of the viewing site 48. The viewing site 48 is presented thus to the beam of light produced by the lamp 46 (FIG. 1). Incident light reflects off of the card 14 to provide imaging data, the light beam being shown diagrammatically in both FIGS. 5F and 5G.

Figure 5G:
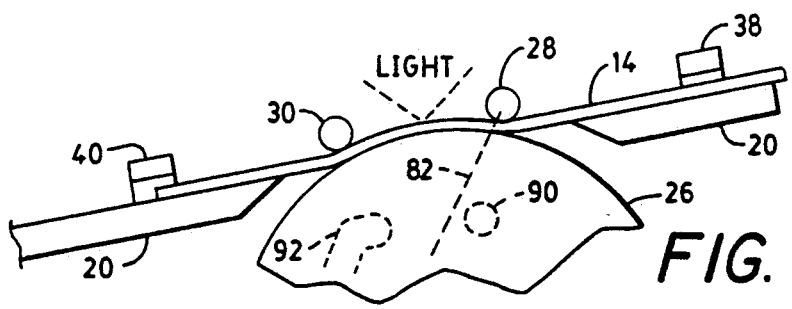

The drum 26 continues to rotate in the reverse direction as the light beam produces data on successive scan lines, the optical data being detected by the detector assembly 22 (FIG. 1) and transmitted via the converter 66 to the signal processor 16 in a manner as fully described in U.S. patent application Ser. No. 328,314, entitled "Color Balanced Image Detector System", by W. Smyth, filed in common assignment herewith and now fully incorporated herein by reference. Continued rotation of the drum 26 in the reverse direction brings the trailing edge of the card 14 to the inner sensor 40 as depicted in FIG. 5G. During the continued reverse rotation of the drum 26, the swing arm 82 remains in abutment with the outer stop 90, and holds the outer roller 28 at a fixed predetermined distance from the inner sensor 40. This distance is stored previously by the computer 16A. Thereby, the computer 16A can direct a further increment of reverse rotation of the drum 26 to bring the leading edge of the card 14 from the inner sensor 40 to the first nip at the outer roller 28.

Figure 5H:
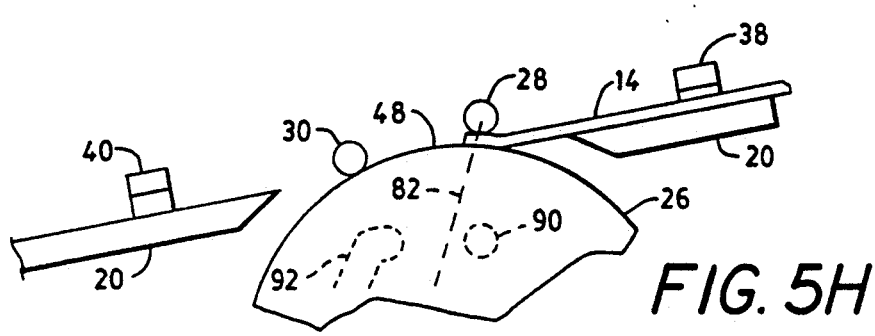

FIG. 5H shows the position of the card 14 after the additional retraction of the card 14 to bring the leading edge of the card 14 to the first nip. At this location of the card 14, there is no portion of the card 14 within the viewing site 48 and, accordingly, the computer 16A discontinues the admission of optical data from the detector assembly 22. The scan has been completed. If desired, a rescan of a part or all of the card 14 can now be accomplished by a repetition of the steps of FIGS. 5B–5H. Since the location of the card 14 is known to the computer 16A, and since the length of the card 14 is known to the computer 16A, the rescan of all or any part of the card can be accomplished readily by simply inputting to the computer 16A the desired region of the card 14 to be rescanned.

A comparison of FIGS. 5A and 5B shows an accomplishment of the invention in reducing the spacing between the rollers 28 and 30 so as to facilitate a transference of the leading edge of the card 14 from the first nip (between the outer roller 28 and the drum 26) to the second nip (between the inner roller 30 and the drum 26). By decreasing the spacing between the two nips, the leading edge can be transferred securely without the danger of the leading edge being deflected away from the second nip, as might occur with the relatively large spacing of FIG. 5A, in the situation wherein the card 14 may be bent or otherwise disfigured. Furthermore, as depicted in FIGS. 5E and 5F, prior to the initiation of optical scanning to obtain the imaging data, the spacing between the rollers 28 and 30 is increased so as to present the entire viewing site 48 to the light beam to accomplish optical scanning of the card 14.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A scanner operative to move a subject past a light beam comprising:
   a drum disposed in an optical path of the light beam;
   a first roller and a second roller, both of said rollers being in contact with a cylindrical surface of said drum and lying along a path of travel of the subject, rotation of said drum moving the subject along said travel path, said first roller and said drum defining a first nip for receiving the subject upon insertion of the subject into the scanner, there being a spacing between the axes of said rollers which is variable from a first distance to a second distance, said first distance being substantially less than said second distance, the second distance defining a viewing site between said rollers for receipt of the light beam; and
   means for varying said axial spacing between said rollers, said spacing being decreased to said first distance for transference of a leading edge of the subject from said first nip to a second nip defined by said second roller and said drum, said spacing being increased to said second distance upon a scanning of the subject with the light beam.

2. A scanner according to claim 1 wherein said drum rotates in a forward direction preparatory to said scanning, said drum rotating in a reverse direction during said scanning, a portion of said subject being retained within said first nip during movement of the subject along said travel path.

3. A scanner according to claim 2 wherein said varying means comprises:
a swing arm extending radially outward of a rotational axis of said drum and having an inner end pivotally connected about said drum axis;
means for connecting said first roller to an outer end of said arm opposite said inner end of said arm; and
brake means interconnecting said arm to said drum for producing a torque upon said arm during rotation of said drum, the torque inducing a swinging of said arm and said first roller about said drum.

4. A scanner according to claim 3 further comprising a shaft for supporting said first roller, said first roller being rotatable about said shaft; and wherein
in said varying means, said connecting means includes a spring-loaded strut extending from said shaft of said first roller to said outer end of said swing arm, said strut being pivoted to said arm for urging said first roller toward said drum.

5. A scanner according to claim 4 wherein said varying means comprises means for stopping a swing of said arm at an outer stop point along said travel path and an inner stop point along said travel path, said outer stop point being located between said viewing site and an entry port of the scanner wherein the subject is inserted into the scanner, said inner stop point being located between said outer stop point and said second roller.

6. A scanner according to claim 3 wherein said varying means comprises means for stopping a swing of said arm at an outer stop point along said travel path and an inner stop point along said travel path, said outer stop point being located between said viewing site and an entry port of the scanner wherein the subject is inserted into the scanner, said inner stop point being located between said outer stop point and said second roller.

7. A scanner according to claim 6 further comprising
an outer sensor and an inner sensor of the presence of the subject on said travel path, said outer sensor sensing the presence of the subject at an outer travel point located between said outer stop point and said entry port, said inner sensor sensing the presence of the subject at an inner travel point located on a side of said second roller opposite said entry port; and
computer means operative to direct rotation of said drum in the forward direction and in the reverse direction, said computer means being responsive to signals of said outer sensor and said inner sensor to determine a length of said subject measured along said travel path and wherein, upon activation of said computer means subsequent to an insertion of the subject into the scanner, said computer means directs rotation of said drum in the forward direction to bring a trailing edge of the subject into said first nip with said swing arm being at said inner stop point, said computer means then directing a rotation of said drum in the reverse direction to bring said leading edge into said first nip with said swing arm at the position of said outer stop point.

8. A scanner according to claim 3 further comprising means for holding said second roller fixed in position during a movement of said first roller upon a swinging of said arm.

* * * * *